Dec. 9, 1969   B. ORLANDINI ET AL   3,482,966
CONTINUOUS PROCESS FOR LEACHING ZINC CALCINE
Filed Sept. 14, 1967
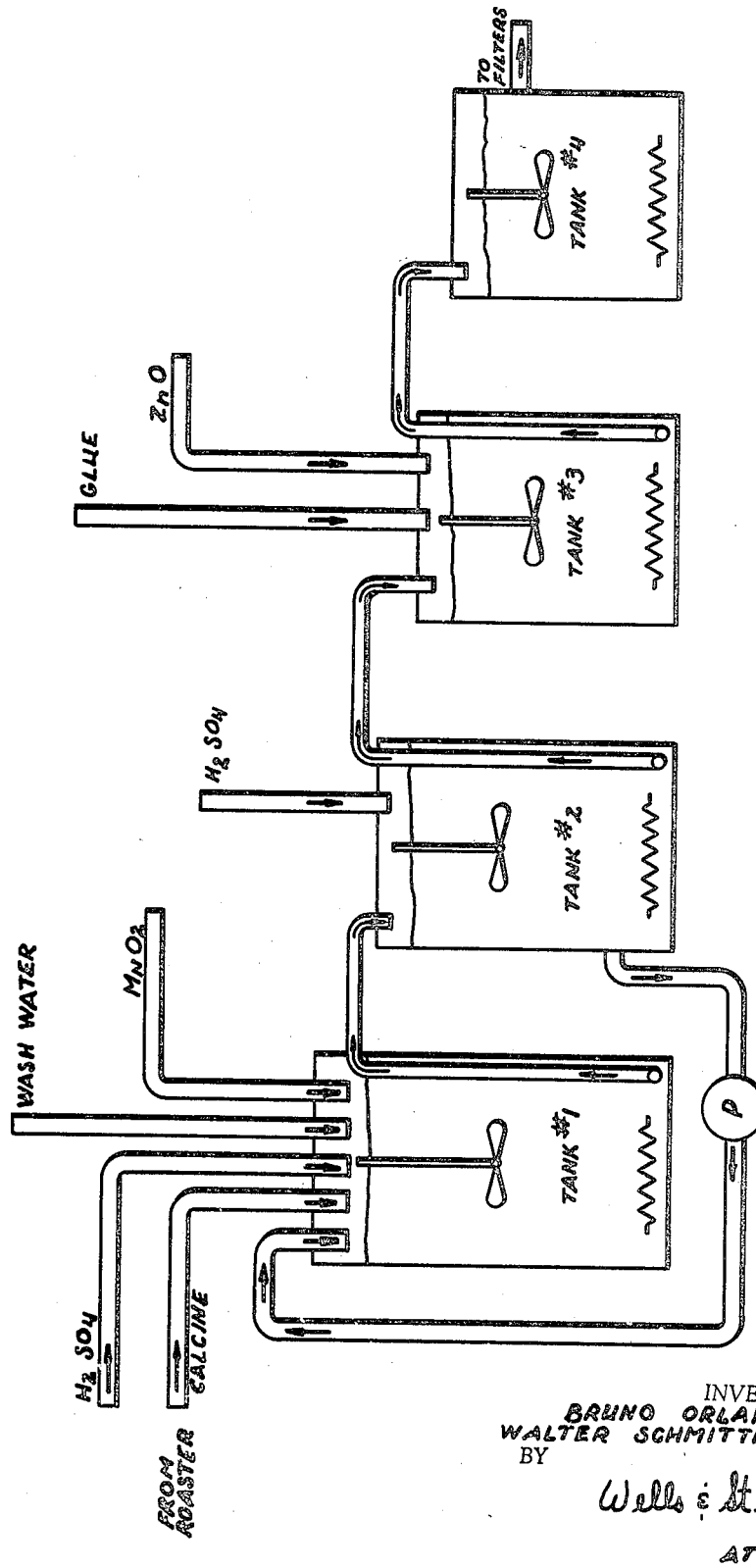
INVENTOR.
BRUNO ORLANDINI
WALTER SCHMITTROTH
BY
Wells & St. John
ATTYS.

United States Patent Office 3,482,966
Patented Dec. 9, 1969

3,482,966
CONTINUOUS PROCESS FOR LEACHING
ZINC CALCINE
Bruno Orlandini and Walter Schmittroth, Kellogg, Idaho, assignors to The Bunker Hill Company, a corporation of Delaware
Filed Sept. 14, 1967, Ser. No. 667,745
Int. Cl. C22b 19/22
U.S. Cl. 75—101                9 Claims

ABSTRACT OF THE DISCLOSURE

A continuous process for leaching zinc calcine is described in which zinc calcine, spent electrolyte, wash water and manganese dioxide are continuously added to a first tank to form a leach pulp. The leach pulp flows to a second tank wherein additional spent electrolyte is added. Three parts out of four of the leach pulp are recycled back to the first tank. From the second tank the leach pulp flows to a third tank wherein additional zinc calcine is added to facilitate the precipitation of many of the impurities.

BACKGROUND OF THE INVENTION

This invention relates to processes for leaching zinc calcine in the recovery of metallic zinc from zinc ores.

The traditional process for leaching zinc calcine is to feed zinc calcine from the roaster into a large tank along with wash water, spent electrolyte from the electrolytic cell, and manganese dioxide. While these ingredients are added to the tank they are agitated to facilitate the dissolution of the zinc calcine. For a 100 volume ton cylindrical tank, having a diameter of 20 feet and a height of 14 feet, it takes between one and one-half hours to two and one-half hours to bring the level of the tank up to approximately the two thirds mark. The manganese dioxide is principally added to the tank to oxidize the ferrous iron compounds and to cause the iron compounds to precipitate from the solution. The spent electrolyte is principally a sulfuric acid solution containing zinc values that were not deposited on the cathode during the electrolytic deposition. The wash water is a solution formed by passing water through a filter downstream of the leaching tank to remove the soluble zinc values from the residue after the leach pulp is filtered. Spent electrolyte and the zinc calcine are added to the tank in proportions sufficient to maintain the acidity of the resultant leach pulp at about 4 pH.

When the leach pulp reaches the desired level, the flow of calcine, manganese dioxide, and wash water are terminated while additional spent electrolyte ($H_2SO_4$) is added to the leach pulp to increase the acidity of the leach pulp to a pH value of approximately 2.5. The increase in acidity increases the dissolution of the zinc calcine. Generally it takes about an hour to add sufficient spent electrolyte to bring the pH value to 2.5.

Subsequently the leach plup is neutralized by the addition of zinc calcine to facilitate the precipitation of many of the impurities in the leach pulp. The addition of the zinc calcine fills the tank close to the top. Then the tank is drained to pass the leach pulp through the filters to separate the solution from the residue before the solution is further processed on the way to the electrolytic cell. It generally takes between 45 minutes and one hour to drain the tank.

By utilizing the above described batch process approximately 25 tons of zinc may be leached in each tank in a 24 hour period. In one particular plant nine 100 volume ton tanks processed 250 tons of zinc in a 24-hour period. It generally takes four men per eight hour shift to operate and control the nine tank batch process.

One of the principal problems associated with the batch process is the inability of effectively compensate for the rapid fluctuation in the flow rates of one or more of the constituents of the leach pulp. When these fluctuations occur, the dissolution of the zinc calcine may be less than satisfactory and may cause poor filtration to the point that it increases the filtration time many fold. This means that the production of the zinc decreases proportionally.

One of the principal objects of this invention is to provide a continuous process for leaching zinc calcine which is vastly more economical than the presently used processes.

An additional object of this invention is to provide a continuous process for leaching zinc calcine that may be more accurately controlled with considerably less personnel to compensate for fluctuations in the flow rate of the ingredients forming the leach pulp.

A further object of this invention is to provide a continuous process for leaching zinc calcine that has greater production and requires 50% less floor space.

An additional object of this invention is to provide a continuous process for leaching zinc calcine that increases the efficiency of the dissolution of the zinc calcine without decreasing the production rate.

These and other advantages and objects of this invention will become apparent upon reading the following description of a preferred embodiment.

BRIEF DESCRIPTION OF THE DRAWING

The accompanying drawing is a schematic flow diagram of the principal components required to perform this process invention.

DESCRIPTION OF THE PREFERRED EMBODIMENT

As illustrated in the accompanying drawing the preferred embodiment concerns a sequential process for leaching zic calcine that contains zinc in the form of zinc oxide. The principal leaching constituent is sulfuric acid ($H_2SO_4$). In a manufacturing facility that recovers zinc by the electrolytic process, sulfuric acid is formed as a by-product of the zinc sulfate electrolyte solution as the zinc ions are deposited on the cathode. During the electrolytic process, the zinc is deposited on the cathode until the concentration of the zinc in the solution drops to a point where it is uneconomical to proceed further. The sulfuric acid solution that remains is termed spent electrolyte. The spent electrolyte, still containing some zinc values, is removed from the electrolytic cell and utilized in the leaching process. If need be, additional sulfuric acid may be added to the spent electrolyte to make up for sulfuric acid losses.

A further constituent of the leach pulp is wash water that also contains some zinc values. The wash water is a solution product produced by passing water through the filters downstream of the leaching process to extract aqueous soluable zinc values that remain in the residue. Manganese dioxide ($MnO_2$) is also added to the leach pulp to facilitate the precipitation of many metallic impurities found in the zinc calcine.

As shown in the accompanying drawing, these constituents are continuously added to tank #1. These ingredients are added to the first tank in proportions to maintain the acidity of the leach pulp at a pH value of 4 or above.

The leach pulp in tank #1 is continually agitated to facilitate the dissolution of the calcine and the interaction of the manganese dioxide with the metallic impurities. It has been found that by keeping the temperature of the leach pulp in tank #1 just below the boiling point of the leach pulp the efficiency of the reactions is increased. It is recommended that the temperature of the leach pulp in tank #1 be maintained at approximately 95° C.

A portion of the leach pulp from tank #1 is continually fed to tank #2. This may be accomplished by many methods such as gravity flow or by use of a pump. This preferred embodiment utilizes a gravity flow system in which leach pulp from the lower portion of tank #1 flows from the side thereof over into the tank #2. In tank #2, additional spent electrolyte or sulfuric acid is added to the leach pulp to increase the acidity of the pulp to a pH value approximately 2.5. The leach pulp in tank #2 is agitated, and heated to a temperature near its boiling point. A temperature of 95° C. is recommended. The increased acidity in tank #2 further increases the dissolution rate of the zinc calcine.

One of the principal steps of this invention is a recycling of a portion of the leach pulp from tank #2 back to tank #1. The recycling is particularly effective in controlling the reactions of this process plus further maximizing the dissolution of the zinc calcine. It has been found that it is particularly effective and efficient to recycle three parts of every four parts of the leach pulp that flows from tank #1 to tank #2. However, the recycle rate may be varied as desired. Therefore, in this example, theoretically the zinc calcine is recycled three times between tank #1 and tank #2 thereby greatly increasing the exposure of the zinc calcine to the leaching action of the sulfuric acid.

A portion of the leach pulp in tank #2 continuously flows to tank #3. Generally speaking, the differential flow rate between the amount of leach pulp that flows to tank #2 minus the amount of leach pulp that is recycled to tank #1 equals the flow rate of the leach pulp from tank #2 to tank #3. As shown in the drawings, the leach pulp is gravity fed from tank #2 to tank #3. In tank #3, zinc calcine is added to the leach pulp to neutralize the leach pulp to a pH value between 4 and 5. The decreased acidity of the solution increases the precipitation of many of the metallic impurities. The leach pulp in tank #3 is maintained at a temperature immediately below the boiling point and is agitated to increase the reaction rate that is taking place therein.

Although not absolutely necessary, it is frequently advantageous to add a coagulant to the leach pulp in tank #3 to coagulate the precipitates to facilitate the filtration of the precipitates from the leach pulp to form a clear solution or filtrate. Glue has been found to be an efficient and economical coagulant for this purpose.

In this embodiment a portion of the leach pulp from the tank #3 continuously flows into tank #4. Although tank #4 is not absolutely necessary to this invention, from a practical standpoint it has many advantages. Tank #4 may be used as a surge and conditioning tank to enable the process to be more effectively controlled to permit a wider range of flow rates without disrupting the process. The leach pulp in tank #4 is agitated and is maintained at a temperature immediately below the boiling point to condition the leach pulp and complete the desired reaction. From tank #4 the leach pulp is passed through filters for removing the residue to form a filtrate solution having dissolved zinc.

The filtrate is further processed to remove impurities before passing to the electrolytic cell.

It should be appreciated that this process is readily suitable for large scale operation. It has been found that by utilizing this process with four 100-volume ton tanks that 305 tons of zinc may be processed in a 24-hour period. Compared with the nine-100 volume ton batch process this process processes 20% more zinc during the same period of time. Also, it should be appreciated that this process, utilizing only four tanks, takes considerably less floor space than the batch process utilizing 9 tanks.

Furthermore, it has been found that this continuous process may be effectively operated and controlled by two operators per shift instead of the four that is required with the nine tank batch process. Thus, one can appreciate the substantial economic consequence and the advantage of this invention compared to those presently used.

Furthermore, this process enables considerably better control of the leach action. This is primarily accomplished by recycling a portion of the leach pulp from tank #2 back to tank #1. It is not infrequent to have the flow rates of the ingredients vary substantially for a short period of time. For example, if the amount of calcine added to tank #1 decreases sharply for a short period of time that does not substantially affect the process since a substantial amount of the leach pulp is returned from tank #2 back to tank #1 tending to offset the sharp decrease in the addition of zinc calcine. If the amount of spent electrolyte flowing to tank #1 is sharply decreased for a short period of time, it does not substantially affect the reactions taking place in the continuous process because a substantial amount of leach is recycled back to tank #1. As previously mentioned, it has been found that by recycling ¾ of the leach pulp the process may be effectively controlled while providing the zinc calcine substantially greater exposure to maximize the amount of zinc calcine that is dissolved.

It should be appreciated that the above described embodiment is simply illustrative of a preferred embodiment of this invention and many other embodiments may be readily devised by those skilled in the art that utilize the principles of this invention and fall within the scope thereof. Therefore, only the following claims are intended to define this invention.

What is claimed is:

1. A process for continuously leaching zinc calcine to separate the zinc from metallic impurities such as iron, said process comprises the steps of:
   (a) forming a leach pulp in a first tank by continuously adding zinc calcine, sulfuric acid solution, wash water and manganese dioxide;
   (b) continuously moving a portion of the leach pulp from the first tank to a second tank;
   (c) continuously adding a sulfuric acid solution to the second tank to increase the acidity of the leach pulp to dissolve a maximum amount of the zinc from the zinc calcine;
   (d) recylcling a portion of the leach pulp from the second tank back to the first tank;
   (e) continuously moving a portion of the leach pulp from the second tank to a third tank;
   (f) continuously adding zinc oxide to the third tank to neutralize the leach pulp to precipitate metallic impurities; and
   (g) continuously moving the leach pulp from the third tank.

2. The process as defined in claim 1 wherein the leach pulp in the three tanks is maintained at a temperature just below the boiling point of the leach pulp.

3. The process as defined in claim 1 further comprising the steps of agitating the leach pulp in the three tanks.

4. The process as defined in claim 1 further comprising the step of continuously moving a portion of the leach pulp from the third tank to a fourth tank to permit additional conditioning of the leach pulp moving a portion of the leach pulp from the fourth tank and filtering the leach pulp after it leaves the fourth tank.

5. The process as defined in claim 1 wherein a coagulant is added to the leach pulp in the third tank to coagulate the precipitate to facilitate the effective filtration of the precipitates from the zinc enriched solution.

6. The process as defined in claim 1 wherein the zinc calcine and sulfuric acid solution are added to the first tank in proportion to maintain the pH of the leach pulp in the first tank approximately 4.

7. The process as defined in claim 6 wherein sufficient sulfuric acid solution is added to the second tank to maintain the pH level in said tank at approximately 2.5.

8. The process as defined in claim 7 wherein sufficient zinc oxide is added to the third tank to maintain the pH level in said tank above 4.

9. The process as defined in claim 1 wherein of every 4 parts of leach pulp that are moved from the first tank to the second tank, three parts are recycled from the second tank back to the first tank.

References Cited

UNITED STATES PATENTS 2,754,174  7/1956  Roberts _____ 23—125

OTHER REFERENCES

Van Arsdale: Hydrometallurgy of Base Metals, McGraw Hill Inc., N.Y., 1953, pages 206–211 and 220–222.

Ralston: Electrolytic Deposition & Hydrometallurgy of Zinc, McGraw Hill Inc., N.Y., 1921, pages 68–69.

Mathews C. H.: Zinc, The Science & Technology of The Metal, Its' Alloys and Compounds; ACS Monograph Series, Rheinhold Publishers, N.Y., 1957, pages 183–191.

OSCAR R. VERTIZ, Primary Examiner

G. O. PETERS, Assistant Examiner

U.S. Cl. X.R.

23—125; 75—115